United States Patent
Zheng (10) Patent No.: US 8,161,523 B2
(45) Date of Patent: Apr. 17, 2012

(54) METHOD AND APPARATUS FOR NETWORK ACCESS CONTROL (NAC) IN ROAMING SERVICES

(75) Inventor: Xiongkai Zheng, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 480 days.

(21) Appl. No.: 12/424,786

(22) Filed: Apr. 16, 2009

(65) Prior Publication Data

US 2009/0276827 A1 Nov. 5, 2009

(30) Foreign Application Priority Data

Apr. 30, 2008 (CN) .......................... 2008 1 0105687

(51) Int. Cl.
*H04W 12/06* (2009.01)
*H04L 29/06* (2006.01)
*H04W 8/00* (2009.01)

(52) U.S. Cl. .................... 726/1; 726/3; 726/4; 709/225; 709/229

(58) Field of Classification Search .................. 726/1, 3, 726/4; 709/225, 229
See application file for complete search history.

(56) References Cited

U.S. PATENT DOCUMENTS

| | | | | |
|---|---|---|---|---|
| 6,873,988 | B2 * | 3/2005 | Herrmann et al. ..................... | 1/1 |
| 7,483,698 | B2 * | 1/2009 | Hurtta ......................... | 455/432.1 |
| 7,592,906 | B1 * | 9/2009 | Hanna et al. ................... | 340/506 |
| 7,827,545 | B2 * | 11/2010 | Choe et al. ..................... | 717/168 |
| 2004/0103310 | A1 * | 5/2004 | Sobel et al. ................... | 713/201 |
| 2004/0107360 | A1 * | 6/2004 | Herrmann et al. ............ | 713/201 |
| 2004/0167984 | A1 * | 8/2004 | Herrmann ..................... | 709/229 |
| 2004/0205193 | A1 * | 10/2004 | Hurtta et al. .................. | 709/227 |
| 2005/0060319 | A1 * | 3/2005 | Douglas et al. ................. | 707/10 |
| 2005/0063400 | A1 * | 3/2005 | Lum ............................. | 370/401 |
| 2005/0086510 | A1 * | 4/2005 | Nicodemus et al. .......... | 713/200 |
| 2005/0144481 | A1 * | 6/2005 | Hopen et al. .................. | 713/201 |
| 2005/0246767 | A1 * | 11/2005 | Fazal et al. ..................... | 726/11 |
| 2005/0273850 | A1 * | 12/2005 | Freund ........................... | 726/14 |
| 2005/0278775 | A1 * | 12/2005 | Ross ................................ | 726/2 |
| 2006/0010485 | A1 * | 1/2006 | Gorman .......................... | 726/3 |
| 2006/0075140 | A1 * | 4/2006 | Sobel et al. .................... | 709/245 |
| 2006/0130139 | A1 * | 6/2006 | Sobel et al. ..................... | 726/22 |
| 2006/0161970 | A1 * | 7/2006 | Hopen et al. ..................... | 726/4 |
| 2006/0200856 | A1 * | 9/2006 | Salowey et al. ................... | 726/5 |

(Continued)

FOREIGN PATENT DOCUMENTS

CN 101018232 8/2007
CN 101123493 2/2008

OTHER PUBLICATIONS

Calhoun, Pat R. and Charles E. Perkins. "Diameter Mobile IP Extensions", Feb. 2001.*

(Continued)

*Primary Examiner* — Michael Simitoski (57) ABSTRACT

The present invention discloses a method and apparatus for network access control (NAC) in roaming services. In embodiments of the present invention, roaming quarantine access policies and roaming secure access policies are defined on access devices to control access of roaming terminals, instead of defining unified access policies on network-wide access devices. Embodiments of the present invention allow each branch network to enforce and update access policies as needed without restrictions of network identification and adaptation, making it easier to implement NAC on a distributed network, and improving NAC development. Embodiments of the present invention provide widely applicable, easy-to-implement NAC solutions for roaming.

16 Claims, 6 Drawing Sheets

U.S. PATENT DOCUMENTS

| | | | |
|---|---|---|---|
| 2007/0006288 A1* | 1/2007 | Mayfield et al. | 726/5 |
| 2007/0107043 A1* | 5/2007 | Newstadt et al. | 726/2 |
| 2007/0169171 A1* | 7/2007 | Kumar et al. | 726/2 |
| 2008/0307488 A1* | 12/2008 | Hammond et al. | 726/1 |
| 2009/0077616 A1* | 3/2009 | Lindholm et al. | 726/1 |
| 2009/0113540 A1* | 4/2009 | Chandwani | 726/13 |
| 2009/0217350 A1* | 8/2009 | Manning et al. | 726/3 |
| 2009/0313680 A1* | 12/2009 | Hirano | 726/3 |
| 2010/0293595 A1* | 11/2010 | Naslund et al. | 726/1 |
| 2011/0246586 A1* | 10/2011 | Steele | 709/206 |

OTHER PUBLICATIONS

Calhoun, P. et al. "Diameter Base Protocol", Sep. 2003.*
Cappiello, M. et al. "Mobility amongst Heterogeneous Networks with AAA Support", 2002.*
Laurent-Maknavicius, Maryline et al. "Inter-Domain Security for Mobile IPv6", 2002.*
Perkins, C. "IP Mobility Support", Oct. 1996.*
"Analysis of Endpoint Admission Defence Solution", Fujian Computer, Apr. 2007 and English Abstract thereof.

* cited by examiner

METHOD AND APPARATUS FOR NETWORK ACCESS CONTROL (NAC) IN ROAMING SERVICES

CROSS-REFERENCE TO RELATED APPLICATIONS

The present application claims priority to Chinese Patent Application CN 200810105687.X filed in the PRC Patent Office on Apr. 30, 2008, the entire contents of which is incorporated herein by reference.

BACKGROUND

1. Field of the Invention

This invention relates in general to the field of network security technology and, more particularly, to a NAC method to implement roaming, and to an authentication server and a security policy server for roaming.

2. Description of the Related Art

As network applications prevail and grow, network security becomes extremely important to corporations and enterprises. The NAC technology is mainly implemented based on access devices, authentication servers, and security policy servers. When attempting to access a network, the access terminal is led by the access device to the authentication server for authentication. After the access terminal passes authentication, the authentication server delivers a quarantine access policy and instructs the access device to apply the policy. At this time, the access terminal can only access a restricted network, called the quarantine network. The access terminal then sends a security check request to the security policy server. If the security policy server considers that the access terminal meets the requirements, it delivers a security access policy that is then applied by the access device. After that, the access terminal is allowed to access other network resources.

When NAC is introduced to the distributed network of a large-scale enterprise, public institution, or global corporation that contains a large number of branch organizations, each branch organization needs to be configured with an individual access device, authentication server, and security policy server. Each authentication server and security policy server store information about all the local users, including user authentication information and security policies, to perform authentication and security check on network users, and control their accesses to the network. Security policies comprise quarantine and secure access policies configured for the users, check items, and so on.

Enterprise users registered on other branch networks may enter the local branch network as required by the job, such as on a business trip or for a temporary transference. To implement roaming services, NAC usually needs cooperation from the home authentication server and home security policy server, because the local authentication server and security policy server does not store the authentication information and security policies of users from other branch networks. The home authentication server and home security policy server are located on the network where user services were registered. User authentication information and security policies are stored on the home network.

To implement NAC for roaming terminals, the local authentication server forwards the received authentication request from a roaming terminal to the home authentication server, and then delivers to the access device the quarantine access policy returned from the home authentication server; similarly, the local security policy server forwards the received security check request of a roaming terminal to the home security policy server, and then delivers the secure access policy returned from the home security policy server to the access device. The term roaming terminal used throughout this document can be a local terminal used by external network users, or an external network terminal used by external network users. The terminal is a network device such as a portable device or a desktop PC.

Although the preceding technical proposal can implement NAC for terminals accessing a visited network, implementations of such a solution have limitations. The access device is preconfigured with detailed contents of access policies that are to be applied, while the authentication server or security policy server is configured with access policy IDs only. The access device obtains the detailed access policy according to the ID delivered from the authentication server or security policy server, and then applies the obtained access policy.

Such a roaming technical proposal requires network-wide unified access policies and corresponding IDs that allow the access device on the visited network to identify the ID of the access policy sent from a home network device and to obtain corresponding access policies. Otherwise, the access device on the visited network cannot identify access policies sent from the home authentication server or home security policy server, and as a result, NAC for roaming terminals fails. To configure unified access policies on the network-wide authentication servers, security policy servers and access devices is a complex and tedious job, not to mention obvious impacts on the flexibility of configuring access policies, thus restricting the use of NAC. Therefore, widely applicable, easy-to-implement NAC for roaming is urgently needed.

SUMMARY

The present invention provides a NAC method for roaming. The method can enhance the availability of NAC deployment, and implements more feasible NAC on roaming terminals.

This invention claims a NAC method for roaming. The local network to which the method is applied comprises at lease an authentication server, a security policy server, and an access device. The authentication server authenticates access terminals. The security policy server carries out security check on access terminals. The access device uses access policies to control access of roaming terminals. The method comprises:

after a roaming terminal passes authentication carried out by the local authentication server, the authentication server instructing the local access device to apply the roaming quarantine access policy, which is configured for access terminals roaming to the local network, to the roaming terminal; the local access device applying the roaming quarantine access policy to the terminal according to the instruction;

after a roaming terminal passes security check carried out by the local security policy server, the local security policy server instructing the local access device to apply the roaming secure access policy, which is configured for access terminals roaming to the local network, to the roaming terminal; the local access device applying the roaming secure access policy according to the instruction.

This invention also provides authentication servers and security policy servers for roaming. Using the devices provided by this invention enhances the availability of NAC deployment and implements more feasible NAC for roaming terminals.

This invention claims an authentication server for roaming. The authentication server is applied to a NAC network system and comprises a processing unit and an execution unit.

The processing unit, after the roaming terminal passes authentication, informs the execution unit to apply to the roaming terminal the roaming quarantine access policy configured for access terminals that roam to the local network;

The execution unit, after receiving the notification from the processing unit, instructs the local access device to apply to the roaming terminal the preconfigured roaming quarantine access policy.

This invention claims a security policy server for roaming. The security policy server is applied to a NAC network system and comprises a control unit and an operation unit.

The control unit informs the operation unit to deliver to the roaming terminal the roaming secure access policy for access terminals that roam to the local network after the roaming terminal passes authentication.

The operation unit, after receiving the notification from the control unit, instructs the local access device to deliver the roaming secure access policy to the roaming terminal.

The NAC technical proposal for roaming of the present invention defines roaming quarantine and roaming secure access policies on the access device for roaming terminals, instead of defining unified access policies on all access devices on the entire network. Embodiments of the present invention allow each branch network to enforce and update access policies as needed without restrictions of network identification and adaptation, make it easier to implement NAC on a distributed network, and improve NAC development. Embodiments of the present invention provide widely applicable, easy-to-implement NAC solutions for roaming.

DETAILED DESCRIPTION

To provide a widely applicable, easy-to-implement NAC solution for roaming, an embodiment of the present invention allows the access device on each branch network to be configured with roaming access policies, including the roaming quarantine access policy and roaming secure access policy, for access terminals that roams to the local network, and to apply the policies to access terminals that roam to the local network. The local network is the network that a roaming terminal visits. The local access device does not need to identify the ID of the access policy sent from the home network device, and thus whether the access policy of the local network matches that of the home network is not related. Therefore, embodiments of the present invention provide widely applicable, easy-to-implement NAC for roaming.

Figure 1:
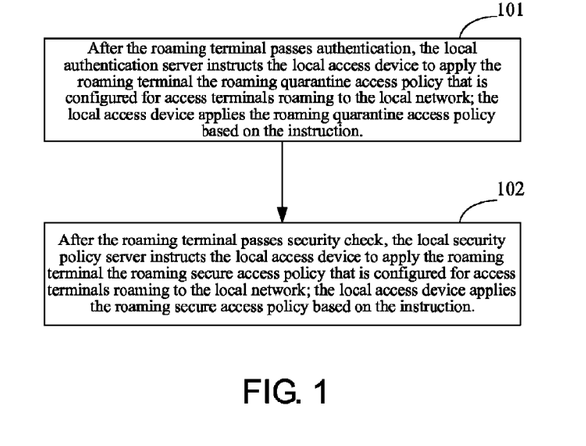
FIG. 1 is a flow chart of the method in accordance with the present invention.

FIG. 1 is a flow chart of the method in accordance with the present invention. At least an authentication server, security policy server, and access device are located on the local network using the present method. The method comprises these steps:

At step 101, after a roaming terminal passes authentication carried out by the local authentication server, the authentication server instructs the local access device to apply the roaming quarantine access policy, which is configured for access terminals roaming to the local network, to the roaming terminal; the local access device applies the roaming quarantine access policy according to the instruction;

At step 102, after the roaming terminal passes the security check carried out by the local security policy server, the security policy server instructs the local access device to apply the roaming secure access policy, which is configured for access terminals roaming to the local network, to the roaming terminal; the local access device applies the roaming secure access policy according to the instruction.

Preceding contents show that the NAC solution mainly comprises two parts, authenticating the roaming terminal and carrying out the security check on the access terminal. To authenticate the access terminal, the local authentication server needs to obtain authentication information of the access terminal from the home authentication server, because the user information of the access terminal is stored on the home network. The local authentication server can also forward the authentication request of the roaming terminal to the home authentication server for authentication. That is, upon receiving the authentication request from the access terminal, the local authentication server forwards the request to the home authentication server after verifying that the current access terminal is a roaming terminal, and receives the authentication result replied from the home authentication server.

There are also two methods for performing security check. One method is that the home security policy server carries out security check on the roaming terminal. To be more specific, upon receiving the security check request from the access terminal, the local security policy server forwards the request to the home security policy server after verifying that the current access terminal is a roaming terminal, and receives the security check result from the home security policy server. The other method is that the local security policy server uses the roaming check policy for the roaming terminal to carry out security check on the roaming terminal. To be more specific, upon receiving a security check request from the access terminal, the security policy server determines that the current access terminal is a roaming terminal, and carries out security check on the roaming terminal based on the roaming check policy that is preconfigured for roaming terminals. Note that the local network is a relative concept, referring to the branch network that the roaming terminal visits. Any network except the home network of the roaming terminal is called a local network when a terminal roams to it.

The authentication server or the security policy server uses the domain name carried in an authentication request or a security check request to determine whether the access terminal is a roaming terminal. In a NAC system, each branch network is configured with a corresponding domain name. When the access terminal sends out an authentication request or security check request, the domain name of the home network is carried in the request. The local authentication server or the local security policy server then uses the domain name to determine whether the current access terminal is a roaming terminal. Here the authentication server is taken as an example. When receiving an authentication request from the access terminal, the local authentication server obtains the domain name by resolving the request. If the domain name is not the domain name used by the local system, the authentication server determines that the access terminal is a roaming terminal. The security policy server determines whether the current access terminal is a roaming terminal in a similar way. In addition, the security policy server can also use another method for verifying a roaming terminal. For example, when verifying that the current access terminal is a roaming terminal, the local authentication server informs the security policy server of the information. Thus, the security policy server removes repeated work.

Similarly, mappings between domain names of branch networks and authentication server addresses or security policy server addresses are stored on each branch network. After verifying that the current access terminal is a roaming terminal, the local authentication server or local security policy server uses the mappings to locate the corresponding address, and forwards the authentication request or security check request to the home network.

Because only a limited number of domain names can be configured on each access device, the method of using the domain name to determine whether an access terminal is a roaming terminal is applicable to distributed networks that contain a small number of branch networks rather than those containing a large number of branch networks. To solve this problem, the present invention also provides another method of verifying whether an access terminal is a roaming terminal.

In this method, branch networks are identified by network IDs. The home network ID is carried in the authentication request sent by the access terminal. Upon receiving the authentication request from the access terminal, the local authentication server resolves the request to obtain the home network ID, and determines whether the local network is the home network for the current access terminal based on the home network ID. If the home network ID indicates the local network, the current access terminal is considered to be a local access terminal. If the home network ID does not indicate the local network, the current access terminal is considered to be a roaming terminal. The security policy server can adopt a similar way as the authentication server. The security policy server can also determine whether the current access terminal is a roaming terminal based on its home network ID. The security policy server can also obtain from the authentication server the information that the current access terminal is a roaming terminal. Mappings between branch network IDs and authentication server or security policy server addresses on the branch network are stored on each branch network. After the current access terminal is considered to be a roaming terminal, the authentication server or security policy server can search the stored mappings to obtain the home authentication server address or home security policy address, and forward the request for authentication or security check to the home network.

Access policies used in this invention can be implemented by configuring Access Control Lists (ACLs) or Virtual Local Area Networks (VLANs). If ACLs are used, the roaming quarantine ACL and roaming secure ACL are configured on the access device, while corresponding identification information is configured on the authentication server and the security policy server respectively. To apply an ACL to the roaming terminal, the local authentication server or local security policy server delivers the identification information of the roaming quarantine ACL or roaming secure ACL to the access device, which then finds out the corresponding ACL according to the identification information and applies the ACL to the roaming terminal.

If access policies are implemented through VLANs, the roaming quarantine VLAN and the roaming secure VLAN are configured on the access device, while corresponding IDs are stored on the local authentication server and local security policy server. To apply an access policy to the roaming terminal, the local authentication server or local security policy server delivers the identification information to the access device, which then finds out the corresponding VLAN based on the ID, adds the roaming terminal to the VLAN, and controls access of the roaming terminal to the local network according to the configured properties of the VLAN. Detailed contents of roaming access policies depend on the method of configuring access policies. The roaming access policy is applied to the roaming terminal.

To clarify the aims, technical proposals, and advantages of embodiments of the present invention, the following parts describe technical proposals of this invention in detail by setting two embodiments as examples: one is using the home authentication server to authenticate the roaming terminal, and the other is using the local security policy server and the home security policy server to carry out security check on the roaming terminal. In both embodiments, the AAA server works as the authentication server to authenticate access terminals through RADIUS, and determine whether an access terminal is a roaming terminal according to its home network ID; ACLs are used as access policies. Using VLANs to implement access policies is the same as using ACLs, and hence is omitted.

Embodiment 1

This embodiment mainly introduces the technical proposal where the home AAA server authenticates the roaming terminal, and the home security policy server carries out security check on the roaming terminal.

If the network ID is used to determine whether the current access terminal is a roaming terminal, the primary branch network in a distributed network can be used to assign network IDs to other branch networks. The method is described in detail as follows: The primary branch network collects system information from subordinate branch networks through the Web Services technology, including IP addresses and port numbers of AAA servers and security policy servers on the subordinate networks. After that, the primary branch network assigns a network ID to each subordinate branch network, establishes mappings between network ID and corresponding AAA server and security policy server addresses, and delivers the mappings to subordinate branch networks. In the technical proposal of the present invention, information about subordinate branch networks is also gathered through other technical measures besides Web Services. For example, a branch network can actively report information about AAA servers and security policy servers.

Figure 2:
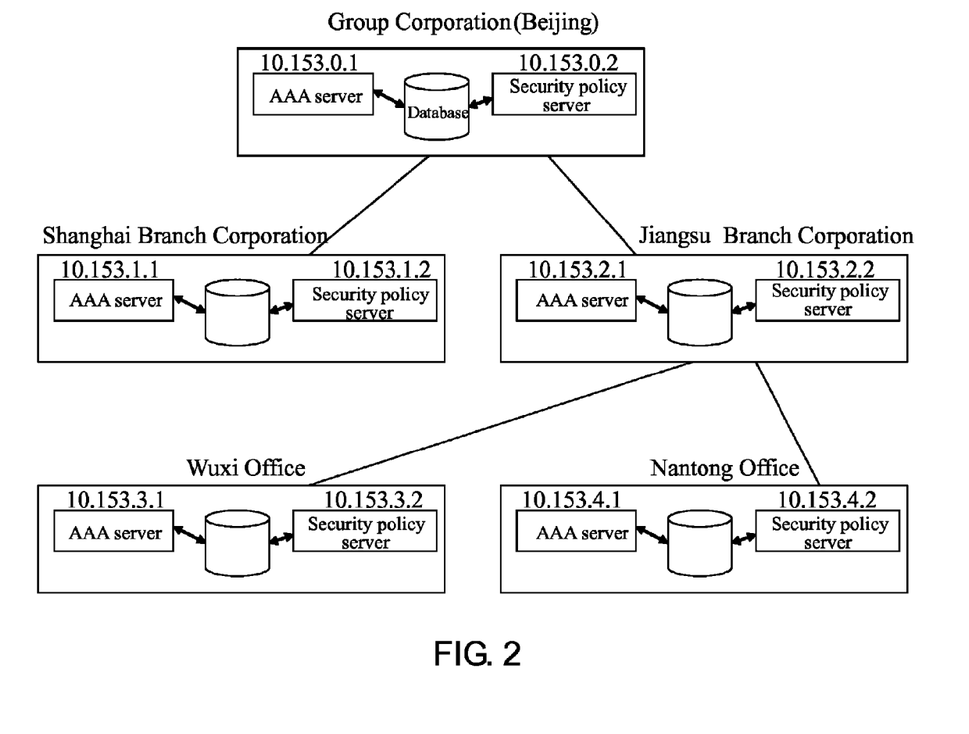
FIG. 2 illustrates the structure of a distributed system according to an embodiment of the present invention.

The following part describes the process of configuring network IDs in the distributed network shown in FIG. 2. In FIG. 2, Beijing Group Corporation is located on the primary branch network. Shanghai Branch Corporation and Jiangsu Branch Corporation are located on secondary branch networks. Wuxi office and Nantong office are located on tertiary branch networks. The primary branch network uses the Web Services technology to collect IP addresses of AAA servers and security policy servers located in branch corporations and offices, and assign network IDs to the branch networks according to the collected IP addresses. For example, bj is assigned to Beijing Group Corporation as the network ID, and similarly, sh for shanghai, js for Jiangsu, wx for Wuxi, and nt for Nantong. Then the primary branch network establishes a table containing mappings between network IDs and AAA server and security policy server addresses, as shown in Table 1.

TABLE 1

| Branch network | AAA server | | Security policy server | | Network ID |
|---|---|---|---|---|---|
| | IP address | Authentication port | IP address | Check port | |
| Beijing Group Corporation | 10.153.0.1 | 1812 | 10.153.0.2 | 9019 | bj |
| Shanghai Branch Corporation | 10.153.1.1 | 1812 | 10.153.1.2 | 9019 | sh |
| Jiangsu Branch Corporation | 10.153.2.1 | 1812 | 10.153.2.2 | 9019 | js |
| Wuxi office | 10.153.3.1 | 1812 | 10.153.3.2 | 9019 | wx |
| Nantong office | 10.153.4.1 | 1812 | 10.153.4.2 | 9019 | nt |

The primary branch network delivers the mapping table to branch networks.

After the assignment of network IDs, the primary branch network needs to configure the quarantine ACL and secure ACL for access terminals that roam to local networks, that is, the roaming terminals, because local access devices cannot identify the quarantine ACL or secure ACL sent from another branch network. Detailed contents of the quarantine ACL and secure ACL configured depend on the branch network. To facilitate description, the quarantine ACL and secure ACL configured for roaming terminals are referred to as the roaming quarantine ACL and roaming secure ACL in this document.

Each branch network can use a dedicated database to store the mapping table delivered from the primary branch network, and the quarantine ACL and secure ACL configured for roaming terminals, and devices on the branch network can access the database as needed. The information can also be stored in the AAA server and security policy server respectively for the server to search as needed.

Figure 3:
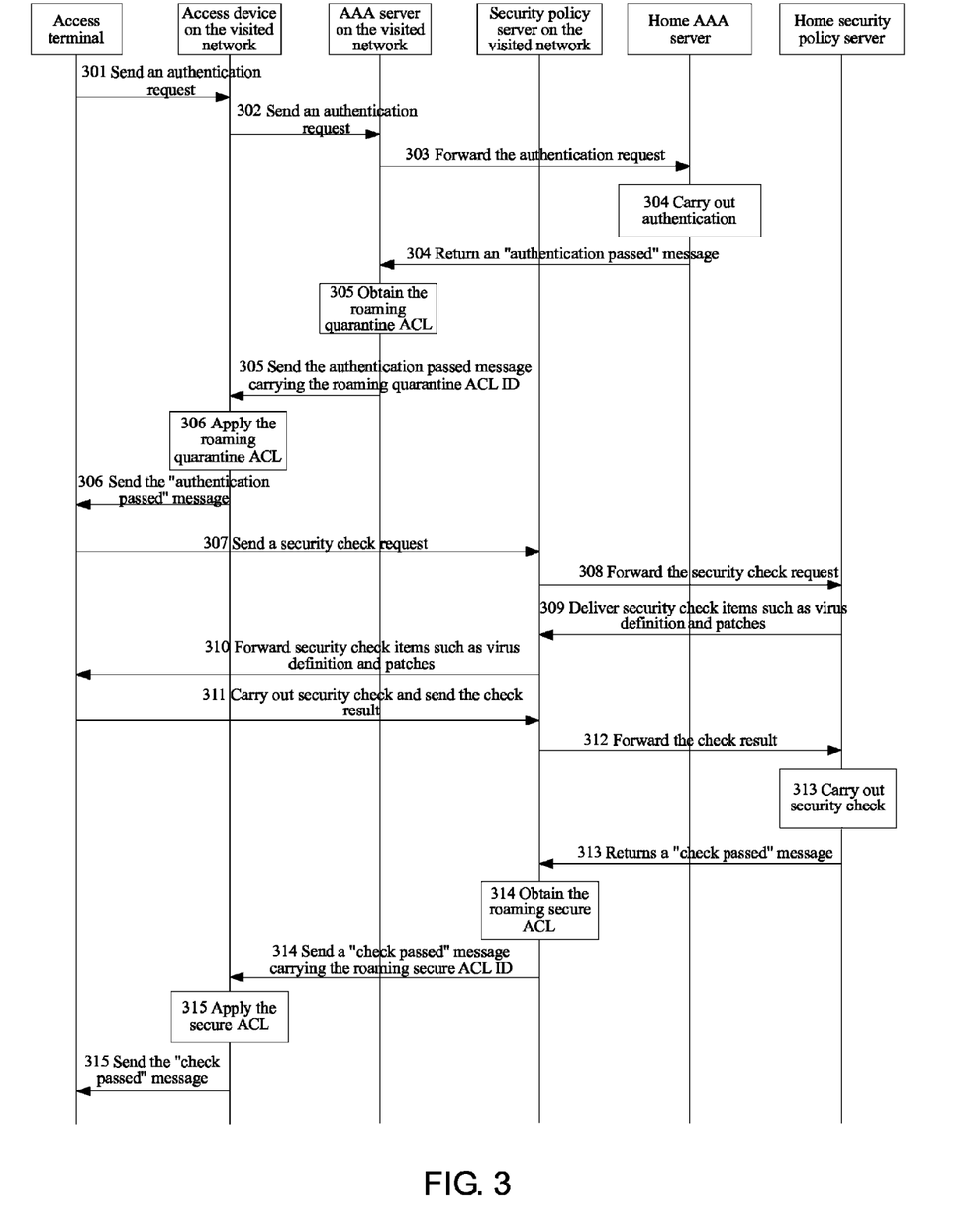
FIG. 3 is the flow chart of the method according to embodiment 1 of the present invention.

As shown in FIG. 3, the flow chart of the method according to the embodiment of the present invention is described in detail as follows:

At step 301, the access terminal sends an authentication request to the access device on the visited network.

The home network ID is carried in the authentication request. The access terminal can set its home network ID as the prefix or suffix of its username, which is carried in the authentication request. Suppose that the home network ID of the current access terminal is Beijing and the user name of the access terminal is Jiessie. The username using the home network ID as the prefix is bj_Jiessie, and that using the network ID as the suffix is Jiessie_bj.

At step 302, the access device forwards the authentication request to the AAA server.

At step 303, the AAA server, after receiving an authentication request forwarded by the access device, forwards the authentication request to the home AAA server after verifying that the access terminal is a roaming terminal.

For the access terminal, the AAA server is an AAA server on the visited network. If the AAA server verifies that the current access terminal is not a roaming terminal, it processes the authentication request of the access terminal in the way of processing local authentication requests.

After resolving the home network ID carried in the authentication request, if the home network ID is not the network ID of the local network, the AAA server determines that the current access terminal is a roaming terminal. If the home network ID is the network ID of the local network, the current access terminal is considered to be a local terminal rather than a roaming terminal. The AAA server can also use the domain name carried in the authentication request to determine whether the current access terminal is a roaming terminal.

At step 304, the home AAA server, after receiving an authentication request sent from the AAA server on the visited network where the access terminal roams, authenticates the current user according to the ID carried in the authentication request, and returns an "authentication passed" message to the AAA server on the visited network after the user passes authentication.

At step 305, the AAA server on the visited network, after receiving the authentication information sent from the home AAA server, obtains the roaming quarantine ACL configured for the roaming terminal, sends an "authentication passed" message containing the obtained roaming quarantine ACL to the access device, and instructs the access device to apply the roaming quarantine ACL to the current roaming terminal.

In current technical implementations, the "authentication passed" message sent from the AAA server contains the quarantine ACL that the home network configures for the access terminal, the IP address of the home security policy server, and the security check port number. The quarantine ACL sent from the home AAA server, however, cannot be applied to the visited network, and the roaming terminal does not directly communicate with the home security policy server; therefore, the local AAA server discards the quarantine ACL, the IP address of the home security policy server, and the security check port carried in the "authentication passed" message sent by the home AAA server, inserts the identification information of obtained roaming quarantine ACL and the address of the local security policy server to the "authentication passed" message, and sends the resulting message to the access device.

The specific method can be as follows: The local AAA server replaces the quarantine ACL carried in the "authentication passed" message sent by the home AAA server with the configured roaming quarantine ACL, that is, change the property of the ACL ID carried in the "authentication passed" message to the roaming quarantine ACL ID (that is, the local ACL ID). This is because that the home AAA server and the AAA server on the visited network may use different ACL IDs to identify the same access quarantine policy. If they use the same ACL ID to describe the access quarantine policy, the ACL ID need not be changed. The local AAA server replaces the address of the home security policy server carried in the message with the address of the local security policy server. The latter address is used when the local AAA server instructs the roaming terminal to send a security check request to the local security policy server.

In current technical implementations, upon receiving the authentication request or security check request sent from a roaming terminal, the access device can forward the authentication request or security check request to the local AAA server or local security policy server for processing, according to the information carried in the request. Therefore, even if the address of the home security policy server is not changed to the address of the local security policy server, the roaming terminal can still send the security check request to the local security policy server for processing.

An advantage in the AAA server's sending the address of the local security policy server to the roaming terminal is that the access terminal can directly send the security check request sent from the roaming terminal to the security policy server, without resolving the request and looking up the address in the mapping table, and thus the processing efficiency is improved.

At step 306, the access device, after receiving the "authentication passed" message sent from the AAA server on the visited network, applies the roaming quarantine ACL carried in the message, and sends the "authentication passed" message to the access terminal.

The access device finds the pre-defined roaming quarantine ACL according to the ACL ID carried in the "authentication passed" message, and applies the instructed roaming quarantine ACL to the current access terminal. After the access device applies the roaming quarantine ACL to the current roaming terminal, the roaming terminal can access the restricted area.

At step 307, the access terminal sends a security check request to the security policy server on the visited network.

After the roaming terminal passes authentication and obtains rights to access the restricted area of the visited network, the roaming terminal can directly interconnect with the security policy server on the visited network.

At step 308, the security policy server on the visited network receives the security check request sent from the current access terminal, and forwards the request to the home security policy server after verifying that the current access terminal is a roaming terminal.

Methods of verifying the current access terminal is a roaming terminal and obtaining the address of the home security policy server are the same as that used by the AAA server on the visited network. For detailed information, refer to step 303.

At step 309, the home security policy server, after receiving a security check request sent from the access terminal, sends security check items including the virus definition and patches to the security policy server on the visited network.

At step 310, the security policy server on the visited network delivers the received security check items including viruses and patches to the current access terminal.

At step 311, the access terminal receives security check items, checks against the items, and reports to the security policy server on the visited network.

At step 312, the security policy server on the visited network forwards the result to the home security policy server.

At step 313, the home security policy server checks whether the result meets the security requirements. If yes, the home security policy server returns a "check passed" message to the security policy server on the visited network.

If not, the home security policy server returns a "check failed" message to the security policy server on the visited network. After that, the access terminal can access the third-party anti-virus server and patch update server on a restricted area to update the virus definition and patches, and then requests for another security check. For the detailed process, refer to the related procedure in existing technical implementations.

At step 314, the security policy server on the visited network obtains the roaming secure ACL configured for roaming terminals, and sends the "check passed" message containing the roaming secure ACL to the access device.

Similar to the "authentication passed" message returned from the home AAA server, the "check passed" message may contain the identification information of the secure ACL that the home network configures for the current access terminal. The security policy server on the visited network can discard the identification information of secure ACL carried in the "check passed" message, add the identification information of the obtained roaming secure ACL to the "check passed" message, and send the message to the access device. To be more specific, the local security policy server replaces the IDs of secure access policy carried in the "check passed" message sent by the home security policy server with the ID of the configured roaming secure access policy, and sends the "check passed" message containing the ID of roaming secure policies to the local access device.

At step 315, the access device, after receiving a "check passed" message, applies the current access terminal the roaming secure ACL instructed in the message, and returns the "check passed" message to the access terminal.

The access device finds the pre-defined roaming secure ACL according to the ACL ID carried in the "check passed" message, and applies the instructed roaming secure ACL to the current access terminal. After the access device applies the roaming secure ACL to the current roaming terminal, the roaming terminal obtains the right to access the restricted area.

Through the preceding process, the technical proposal according to the embodiment of the present invention successfully implements the NAC solution in the distributed network, and allows the roaming terminal to access the local network after passing authentication and security check.

Figure 4:
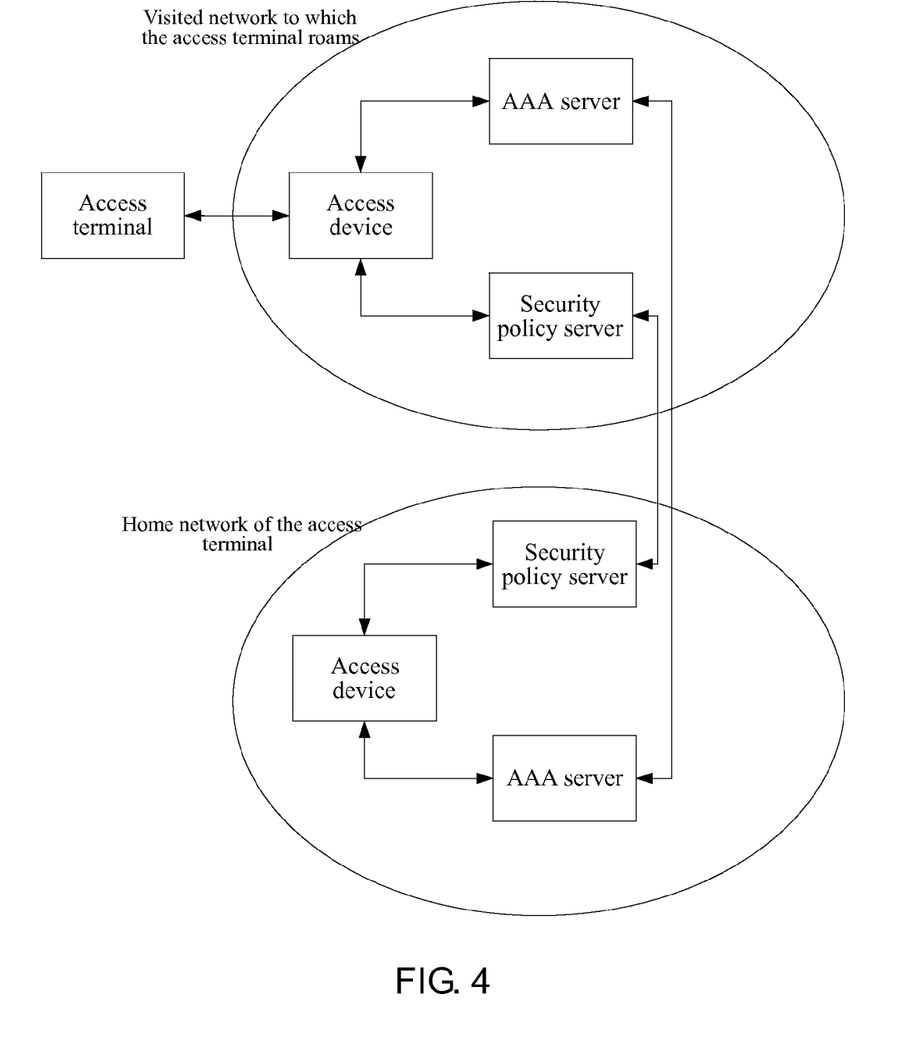
FIG. 4 illustrates the system structure according to embodiment 1 of the present invention.

As shown in FIG. 4, which illustrates the system structure of the embodiment, two of the branch networks are used to introduce the technical proposal for the embodiment. Each branch network comprises at least an AAA server, a security policy server, and an access device.

The AAA server is used to instruct the local access device to apply the roaming quarantine ACL that is configured for the access terminals roaming to the local network to the roaming terminal after the roaming terminal passes authentication. The security policy server is used to instruct the local access device to apply the roaming secure ACL that is configured for the access terminals roaming to the local network to the roaming terminal, after the roaming terminal passes security check. The access device is used to configure quarantine and secure ACLs for access terminals that roam to the local network, and apply the quarantine ACL or secure ACL as the AAA server or security policy server instructs.

Figure 5:
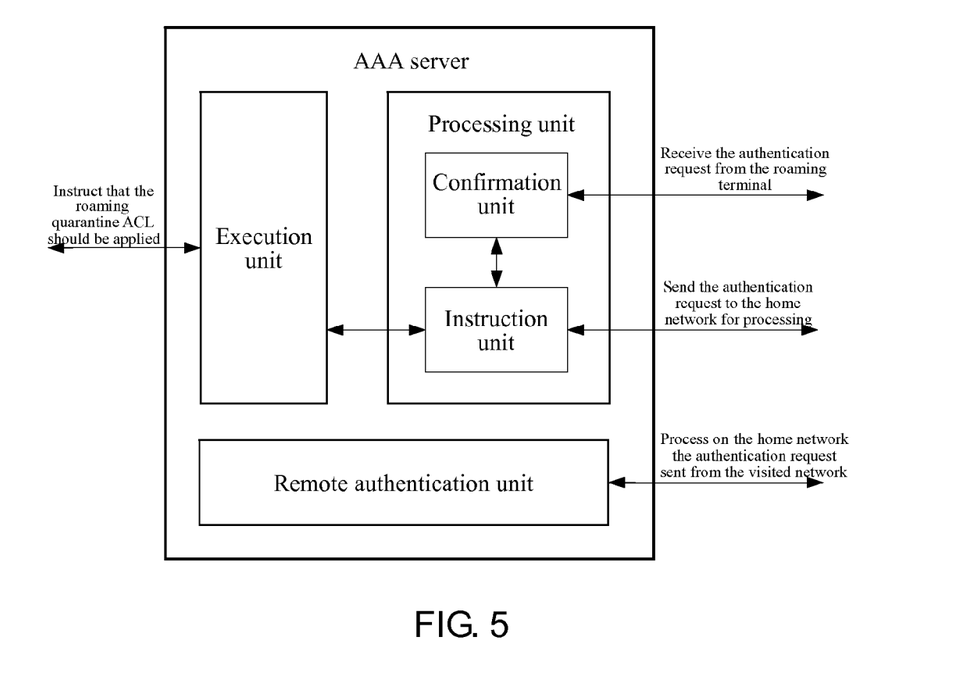
FIG. 5 illustrates the structure of an AAA server according to embodiment 1 of the present invention.

FIG. 5 illustrates the structure of the AAA server used to implement roaming according to the embodiment.

The AAA server comprises a processing unit and an execution unit. The processing unit informs the execution unit to apply the roaming quarantine ACL that is configured for the access terminals roaming to the local network to the current roaming terminal after the roaming terminal passes authentication. The execution unit, after receiving the notification from the processing unit, instructs the local access device to apply the roaming quarantine ACL to the roaming terminal.

The processing unit, after receiving an authentication request sent from the access terminal, forwards the authentication request to the home AAA server after verifying that the access terminal is a roaming terminal, receives the "authentication passed" message sent from the home AAA server, and notifies the execution unit of the message.

The execution unit replaces the ID of the quarantine ACL, which is instructed by the home AAA server, carried in the received "authentication passed" message with the ID of the roaming quarantine ACL, and sends the resulting "authentication passed" message to the local access device to instruct the access device to apply the roaming quarantine ACL to the roaming terminal. The execution unit also can replace the address of the home security policy server carried in the received "authentication passed" message with the address of the local security policy server, and the resulting message is used by the roaming terminal to send a security check request to the local security policy server.

To be more specific, the processing unit can comprise a confirmation unit and an acquisition unit. In the scenario where the domain name is used to determine whether the current access terminal is a roaming terminal, the confirmation unit resolves the domain name carried in the received authentication request, determines that the current access terminal is a roaming terminal if the domain name is not the one used by the local network, and informs the acquisition unit of the information. The acquisition unit receives the notification from the confirmation unit, obtains the address of the home AAA server according to the stored mapping between the domain name and the AAA server address, and sends the received authentication request to the home AAA server for processing. After receiving an "authentication passed" message, the acquisition unit informs the execution unit to apply the roaming quarantine ACL to the current roaming terminal.

In the scenario where the home network ID is used to determine whether the current access terminal is a roaming terminal, the confirmation unit resolves the home network ID carried in the received authentication request, determines that the current access terminal is a roaming terminal if the home network ID does not indicate the local network, and informs the acquisition unit of the information. The acquisition unit receives the notification from the confirmation unit, obtains the address of the home AAA server according to the stored mapping between the home network ID and the AAA server address, and sends the received authentication request to the home AAA server for processing. After receiving an "authentication passed" message, the acquisition unit informs the execution unit to apply the roaming quarantine ACL to the current roaming terminal.

The confirmation unit resolves the prefix or suffix of the user name carried in the authentication request to obtain the home network ID.

The AAA server further comprises a remote authentication unit. The remote authentication unit, after receiving an authentication request from another AAA server, implements authentication based on the received request, and sends the result to the requesting AAA server.

Figure 6:
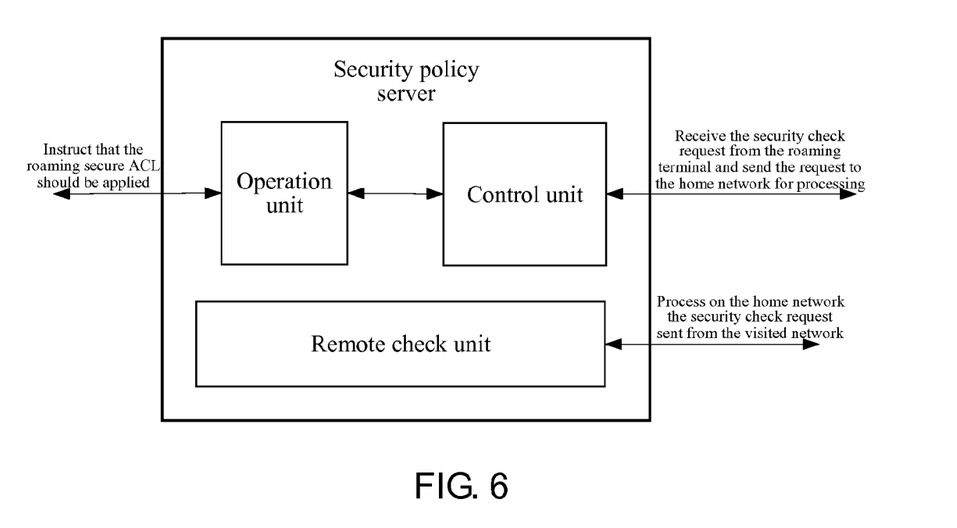
FIG. 6 illustrates the structure of a security policy server according to embodiment 1 of the present invention.

FIG. 6 illustrates the structure of the security policy server used to implement roaming according to the embodiment. The security policy server comprises a control unit and an operation unit. The control unit informs the operation unit to apply the roaming secure ACL that is configured for the access terminals roaming to the local network to the current roaming terminal after the roaming terminal passes security check. The operation unit receives the notification from the control unit, and instructs the local access device to apply the roaming secure ACL to the roaming terminal.

The control unit, after receiving a security check request sent from the access terminal, forwards the security check request to the home security policy server after verifying that the access terminal is a roaming terminal, receives the "check passed" message sent from the home security policy server, and notifies the operation unit of the message.

The security policy server can use a similar functional structure to that of the processing unit of the AAA server, that is, verifying that the current access terminal is a roaming terminal and instructing that the request should be sent to the home security policy server for processing, sending the security check request to the home security policy server, and notifying the operation unit of the message after receiving a "check passed" message from the home security policy server. Hence the detailed process is omitted.

The operation unit replaces the ID of the secure ACL, which is instructed by the home security policy server, carried in the received "check passed" message with the ID of the roaming secure ACL, and sends the resulting "check passed" message to the local access device to instruct the access device to apply the roaming secure ACL to the roaming terminal.

The security policy server further comprises a remote check unit. The remote check unit, after receiving a security check request sent from another security policy server, carries out security check according to the received request, and sends the result to the requesting security policy server.

Embodiment 2

This embodiment mainly introduces the technical proposal where the home AAA server authenticates the roaming terminal, and the security policy server on the visited network carries out security check on the roaming terminal. For the method of assigning home network IDs to branch networks in a distributed network, refer to embodiment 1. In this embodiment, security check is carried out by the security policy server on the visited network, and therefore, you can configure mappings between AAA server address and home network ID only, without address information of the security policy server.

Same as embodiment 1, the roaming quarantine ACL and roaming secure ACL need to be configured for roaming terminals on each branch network. Different from embodiment 1, the security policy server carries out security check on the roaming terminal, and therefore, you need to configure the security check policy in addition to the roaming quarantine ACL and roaming secure ACL.

Figure 7:
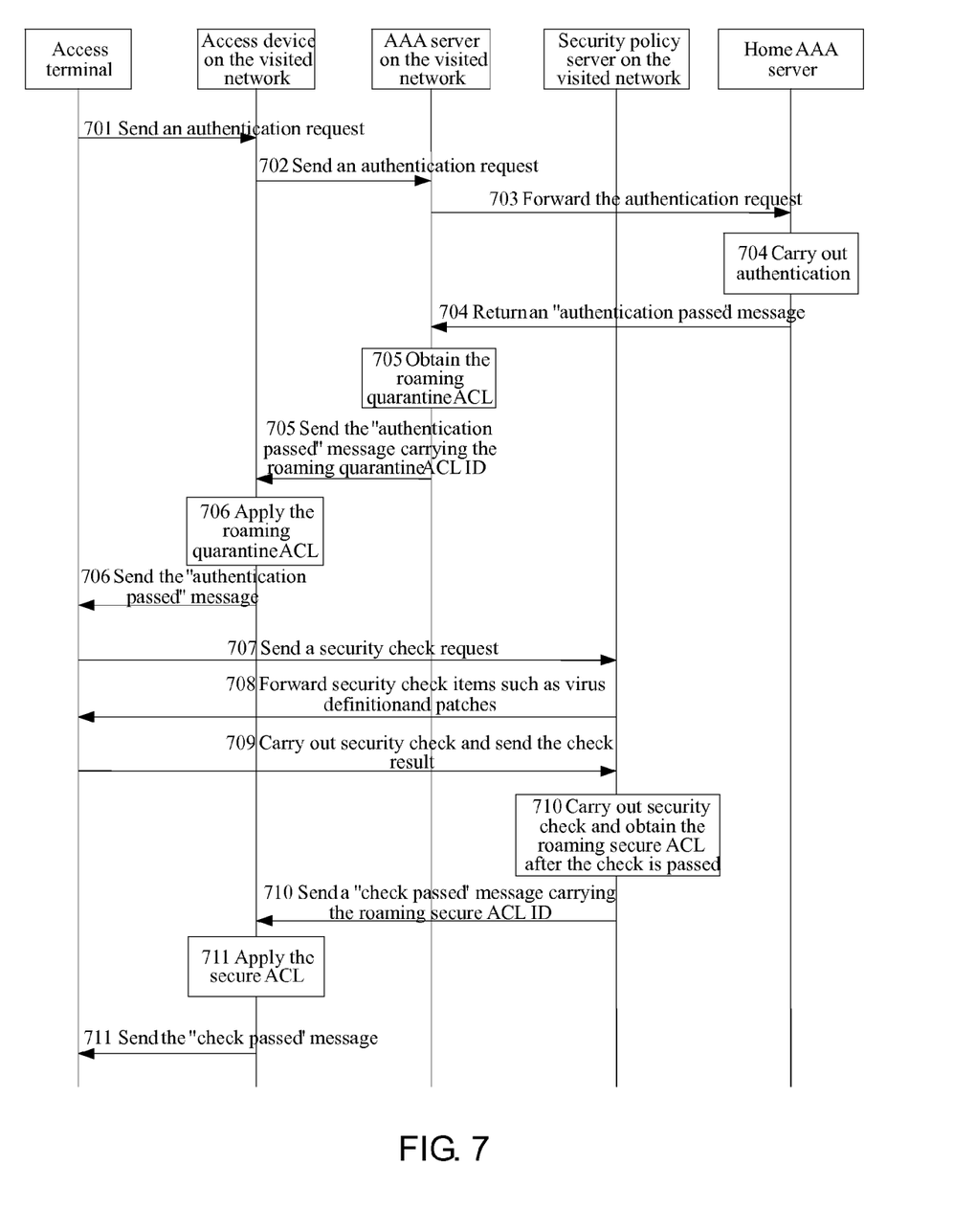
FIG. 7 is the flow chart of the method according to embodiment 2 of the present invention.

As shown in FIG. 7, the flow chart of the method according to the embodiment of the present invention is described in detail as follows:

Steps 701 through 707 are the same as steps 301 through 307 in embodiment 1, and hence are omitted.

At step 708, the security policy sever on the visited network, after receiving a security check request sent from the current access terminal, determines that the current terminal is a roaming terminal, carries out security check on the access terminal according to the pre-configured security check policy, and delivers security check items such as the virus definition and patches to the access terminal.

For methods of verifying whether the current access terminal is a roaming terminal and obtaining the address of the home security policy server, refer to step 303 in embodiment 1.

At step 709, the access terminal receives security check items, checks against the items, and reports to the security policy server on the visited network.

At step 710, the security policy server on the visited network determines whether the received result meets the requirement. If yes, the security policy server on the visited network sends the "check passed" message, which contains the ID of the roaming security ACL configured for roaming terminals, to the access device.

If not, the security policy server on the visited network returns a "check failed" message. After that, the access terminal can access the third-party anti-virus server, and security policy proxy and patch update server in the restricted area to update the virus definition and patches, and then requests for another security check. For the detailed process, refer to the related procedure in existing technical implementations.

At step 711, the access device, after receiving a "check passed" message, applies the secure ACL to the current access terminal as instructed in the message, and returns the "check passed" message to the access terminal.

The access device finds the pre-defined roaming secure ACL according to the ACL ID carried in the "check passed" message, and applies the instructed roaming secure ACL to the current access terminal. After the access device applies the roaming secure ACL to the current roaming terminal, the roaming terminal obtains the right to access the restricted area.

Figure 8:
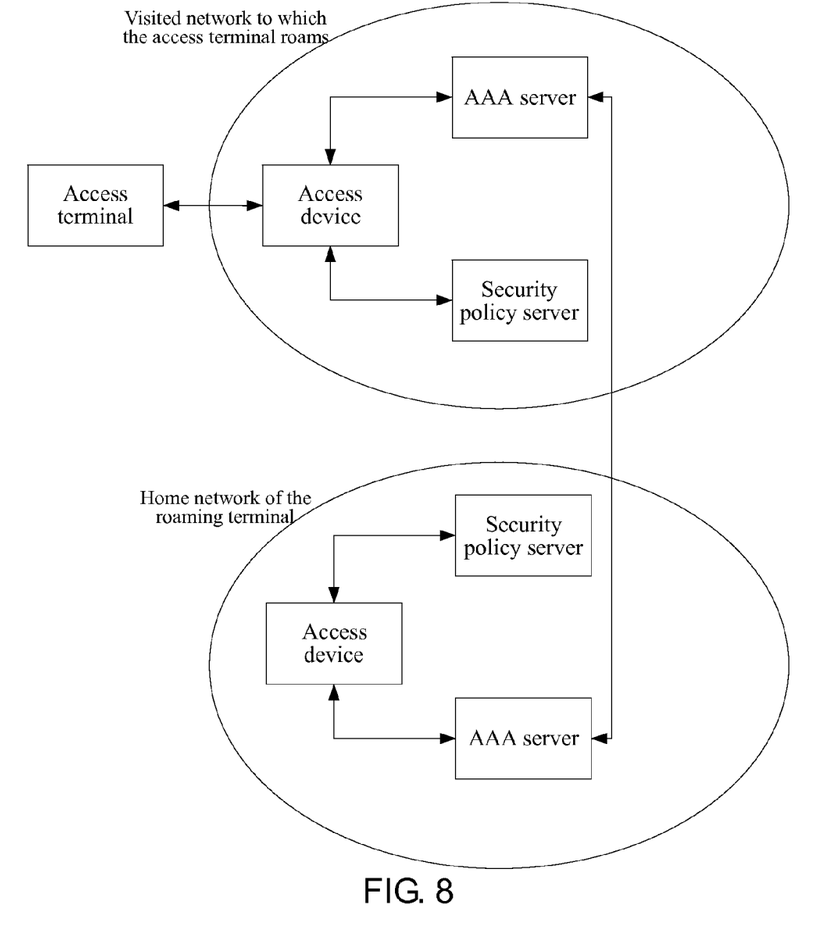
FIG. 8 illustrates the system structure according to embodiment 2 of the present invention.

As shown in FIG. 8, which illustrates the system structure of the embodiment, two of the branch networks are used to introduce the technical proposal for the embodiment. Each branch network comprises at least an AAA server, a security policy server, and an access device.

Relationships among the AAA server, security policy server, access device, and access terminal, and the structure of each device are almost the same as those in embodiment 1. In embodiment 2, the security policy server receives the security check request sent from the access terminal that has passed authentication, determines that the current access terminal is a roaming terminal, and carries out security check on the roaming terminal based on the pre-configured roaming check policy; if the roaming terminal passes security check, the security policy server instructs the access device to apply the roaming security ACL on the roaming terminal.

Figure 9:
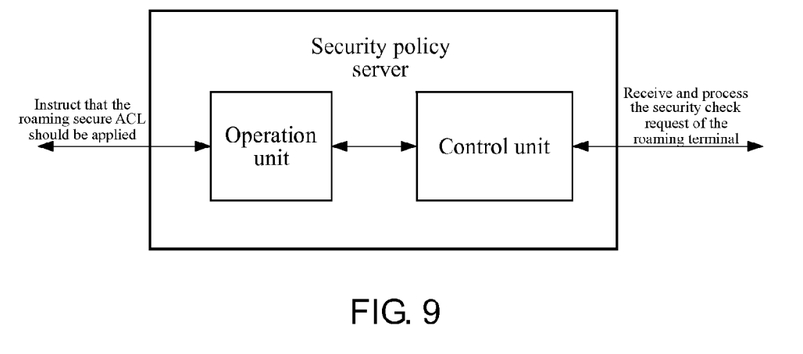
FIG. 9 illustrates the structure of a security policy server according to embodiment 2 of the present invention.

As shown in FIG. 9, which illustrates the structure of a security policy server according to the embodiment, the home security policy server does not comprise the remote check unit, because the security policy server does not carry out security check on the roaming terminal in this embodiment.

In this embodiment, the security policy server comprises a control unit and an operation unit. The control unit receives the security check request from the access terminal, determines that the current access terminal is a roaming terminal, and carries out security check on the roaming terminal based on the roaming check policy configured for the access terminals roaming to the local network. If the roaming terminal passes security check, the control unit informs the operation unit to apply the roaming secure ACL on the current roaming terminal. The operation unit, after receiving the notification from the control unit, instructs the local access device to apply the roaming secure ACL to the roaming terminal.

The structure of the AAA server of this embodiment can be the same as that of embodiment 1, and hence is omitted.

Although the preceding sections describe two preferable embodiments of the invention in detail, they should not limit the scope of the present invention. Accordingly, the preceding embodiments using ACLs are applicable to scenarios where VLANs are used to configure access policies.

The technical proposal of the present invention allows the quarantine access policy, secure access policy, and security check policy to be configured on the access device for the roaming terminal, instead of using unified access policies on all access devices on the entire network; hence, it is easy to use and deploy. The technical proposal allows branch networks to configure and update flexible access policies as required, with no restrictions of network identification and adaptation, provides a NAC solution for distributed networks, and broadens the prospect for the development of the NAC method. The technical proposal of the present invention provides a widely applicable, easy-to-implement NAC solution for roaming.

However, UDP datagrams that the security policy server uses during security check on the access terminal may be discarded when they travel through a network firewall or a network address translation (NAT) device. To prevent UDP packets from traversing the network, embodiment 2 of the present invention uses the security policy server on the visited network to carry out security check on roaming terminals, and thus offers an easy-to-use-and-implement solution for distributed networks comprising firewalls and NAT devices.

Although several embodiments of the invention and their advantages are described in detail, a person skilled in the art could make various alternations, additions, and omissions without departing from the spirit and scope of the present invention as defined by the appended claims.

What is claimed is:

1. A network access control (NAC) method for roaming services applicable to a local network comprising at least a local authentication server, a local security policy server, and a local access device, the method comprising:
   authenticating a roaming terminal by the local authentication server, the local authentication server instructing the local access device to apply a roaming quarantine access policy to the roaming terminal after the roaming terminal is authenticated;
   applying, by the local access device, the roaming quarantine access policy according to the instruction;
   executing a security check on the roaming terminal carried out by the local security policy server, the local security policy server instructing the local access device to apply a roaming secure access policy to the roaming terminal after the roaming terminals passes the security check; and
   applying, by the local access device, the roaming secure access policy according to the instruction;
   wherein authenticating the roaming terminal further comprises:
      the local authentication server receiving an authentication request from an access terminal, determining that the access terminal is a roaming terminal, and forwarding the authentication request to a separate home authentication server for processing; and
      after an "authentication passed" message is returned from the separate home authentication server, instructing the local access device to apply the roaming quarantine access policy to the roaming terminal by the local authentication server replacing a home quarantine access policy ID carried in the "authentication passed" message sent by the home authentication server with a local quarantine access policy ID before sending the message to the local access device.

2. The method of claim 1, further comprising:
   the local authentication server replacing an address of a separate home security policy server carried in the received "authentication passed" message with an address of the local security policy server, and the roaming terminal using the resulting message to send a security check request to the local security policy server.

3. The method of claim 1, wherein the local authentication server determining that the access terminal is a roaming terminal and forwarding the authentication request to the separate home authentication server comprises:
   the local authentication server resolving the domain name carried in the authentication request received from the access terminal;
   determining that the access terminal is a roaming terminal if the resolved domain name is not the same as the domain name of the local network;
   obtaining a network address of the home authentication server from stored mappings between domain names and authentication server addresses; and
   sending the authentication request to the home authentication server.

4. The method of claim 1, wherein:
   a home network ID is carried in the authentication request sent by the access terminal; and the local authentication server determining that the access terminal is a roaming terminal and forwarding the authentication request to the separate home authentication server comprises:
the local authentication server resolving a home network ID carried in the received authentication request;
determining that the current access terminal is a roaming terminal if the home network ID does not indicate the local network;
obtaining an address of the home authentication server from stored mappings between home network IDs and authentication server addresses; and
sending the authentication request to the home authentication server for processing.

5. The method of claim 4, wherein the home network ID is a prefix or suffix of a user name included in the authentication request.

6. The method of claim 1, wherein executing a security check on the roaming terminal comprises:
the local security policy server receiving a security check request from an access terminal, determining that the access terminal is a roaming terminal, forwarding the security check request to a separate home security policy server for processing, and, after receiving a "check passed" message returned from the home security policy server, instructing the local access device to apply the roaming secure access policy to the roaming terminal.

7. The method of claim 6, wherein instructing the local access device to apply the roaming secure access policy comprises:
the local security policy server replacing an ID of a home secure access policy contained in the "check passed" message sent by the home security policy server with an ID of the roaming secure access policy, and sending the resulting "check passed" message to the local access device.

8. The method of claim 1, wherein executing a security check on a roaming terminal comprises:
the local security policy server receiving a security check request sent by an access terminal that passed authentication, determining that the access terminal is a roaming terminal, carrying out a security check on the roaming terminal based on a preconfigured roaming security check policy for the roaming terminal, and, after the roaming terminal passes security check, instructing the access device to apply the roaming secure access policy to the roaming terminal.

9. The method of claim 1, wherein applying the roaming quarantine policy comprises applying a roaming quarantine Access Control List (ACL), and applying the roaming secure access policy comprises applying a roaming secure ACL.

10. The method of claim 1, wherein applying the roaming quarantine policy comprises adding the roaming terminal to a roaming quarantine Virtual Local Area Network (VLAN), and applying the roaming secure access policy is adding the roaming terminal to the roaming secure VLAN.

11. The method of claim 1,
wherein the authentication server is an Authentication, Authorization, and Accounting (AAA) server; and
wherein authenticating the roaming terminal comprises authenticating the roaming terminal through a Remote Authentication Dial In User Service (RADIUS) protocol.

12. An authentication server for authenticating a roaming terminal in a network system implementing network access control (NAC), comprising:
a processing unit configured to:
authenticate the roaming terminal; and
cause a roaming quarantine access policy preconfigured for access terminals that roam the local network to be applied to the roaming terminal; and
cause a local access device to apply to the roaming terminal the preconfigured roaming quarantine access policy;
wherein when the processing unit authenticates the roaming terminal, the processing unit is further configured to:
receive an authentication request from an access terminal;
determine whether the access terminal is a roaming terminal;
forward the authentication request to a separate home authentication server for processing; and
after an "authentication passed" message is returned from the separate home authentication server:
instruct the local access device to apply the roaming quarantine access policy to the roaming terminal; and
replace a home quarantine access policy ID carried in the "authentication passed" message with a local quarantine access policy ID before the message is sent to the local access device.

13. The authentication server of claim 12, wherein the processing unit is further configured to:
obtain a domain name by resolving the received authentication request;
confirm that the access terminal is a roaming terminal if the resolved domain name is not the same as the domain name of the local network;
obtain an address of the home authentication server from stored mappings between domain names and authentication server addresses;
send the received authentication request to the home authentication server for processing; and
after the roaming terminal passes authentication, instruct the execution unit to apply to the roaming terminal the preconfigured roaming quarantine access policy.

14. The authentication server of claim 12, wherein the processing unit is further configured to:
obtain a home network ID by resolving the received authentication request;
determine that the access terminal is a roaming terminal if the home network ID does not indicate the local network;
obtain an address of the home authentication server from stored mappings between home network IDs and authentication server addresses;
send the received authentication request to the home authentication server for processing; and
after the roaming terminal passes authentication, instruct the execution unit to apply the roaming quarantine access policy to the roaming terminal.

15. The authentication server of claim 14, wherein the processing unit is configured to resolve a prefix or suffix of a user name carried in the authentication request to obtain the home network ID.

16. The authentication server of claim 12, wherein:
the authentication server is an Authentication, Authorization, and Accounting (AAA) server, and the roaming terminal is authenticated through the Remote Authentication Dial In User Service (RADIUS) protocol.

* * * * *